United States Patent [19]

Lacquement et al.

[11] Patent Number: 4,811,696

[45] Date of Patent: Mar. 14, 1989

[54] BENT TUBE WASTE HEAT STEAM GENERATOR AND METHOD

[75] Inventors: Ralph G. Lacquement; William L. Ruggles, both of Bartlesville, Okla.

[73] Assignee: Phillips Petroleum Company, Bartlesville, Okla.

[21] Appl. No.: 156,482

[22] Filed: Feb. 16, 1988

[51] Int. Cl.$^4$ .............................................. F22B 1/00
[52] U.S. Cl. ............................ 122/4 D; 122/235 D; 122/367 C; 165/104.15
[58] Field of Search .......... 122/367 C, 235 G, 235 K, 122/235 D, 4 D; 165/104.15

[56] References Cited

U.S. PATENT DOCUMENTS

| | | |
|---|---|---|
| 707,691 | 8/1902 | Gerrard . |
| 711,769 | 10/1902 | Hussey . |
| 1,684,083 | 9/1928 | Bloom . |
| 1,764,173 | 6/1930 | Keehan, Jr. ..................... 122/235 G |
| 2,813,700 | 11/1957 | Schenck, Jr. . |
| 3,230,158 | 1/1966 | Molique . |
| 3,251,404 | 5/1966 | Dickinson . |
| 3,965,976 | 6/1976 | Barton . |
| 4,154,197 | 5/1979 | Costello et al. . |
| 4,170,964 | 10/1979 | Jehn et al. ..................... 122/235 G |
| 4,292,951 | 10/1981 | Gould ................................... 126/20 |

*Primary Examiner*—Edward G. Favors
*Attorney, Agent, or Firm*—Laney, Dougherty, Hessin & Beavers

[57] ABSTRACT

A bent tube waste heat steam generator for use in a catalytic regenerator, and method of use. The regenerator has an outer shell and has a level of catalysts therein. A steam generator is in operative association with the regenerator and includes a riser, downcomer and steam drum positioned externally of the shell and a heat exchanger positioned within the shell. The heat exchanger includes a substantially horizonal lower manifold connected to the downcomer and a substantially horizontal upper manifold connected to the riser. A plurality of substantially C-shaped, bent tubes interconnect the upper and lower manifolds. The upper manifold is above the catalyst level, and the lower manifold is below the catalyst level. Each tube has a lower portion connected to the lower manifold and extending angularly upwardly therefrom, an upper portion connected to the upper manifold and extending angularly downwardly therefrom, and an intermediate portion interconnecting the upper and lower portions. Preferably, the lower, upper and intermediate portions are coplanar. A bank of substantially coplanar tubes are nested together, and a plurality of such banks of tubes are spaced longitudinally with respect to the upper and lower manifolds. Vertically oriented fins may be positioned on the intermediate portions of the tubes, and shielding may be positioned above the upper and lower manifolds. Also, insulation may be placed on the external surface of the upper and lower manifolds.

32 Claims, 2 Drawing Sheets

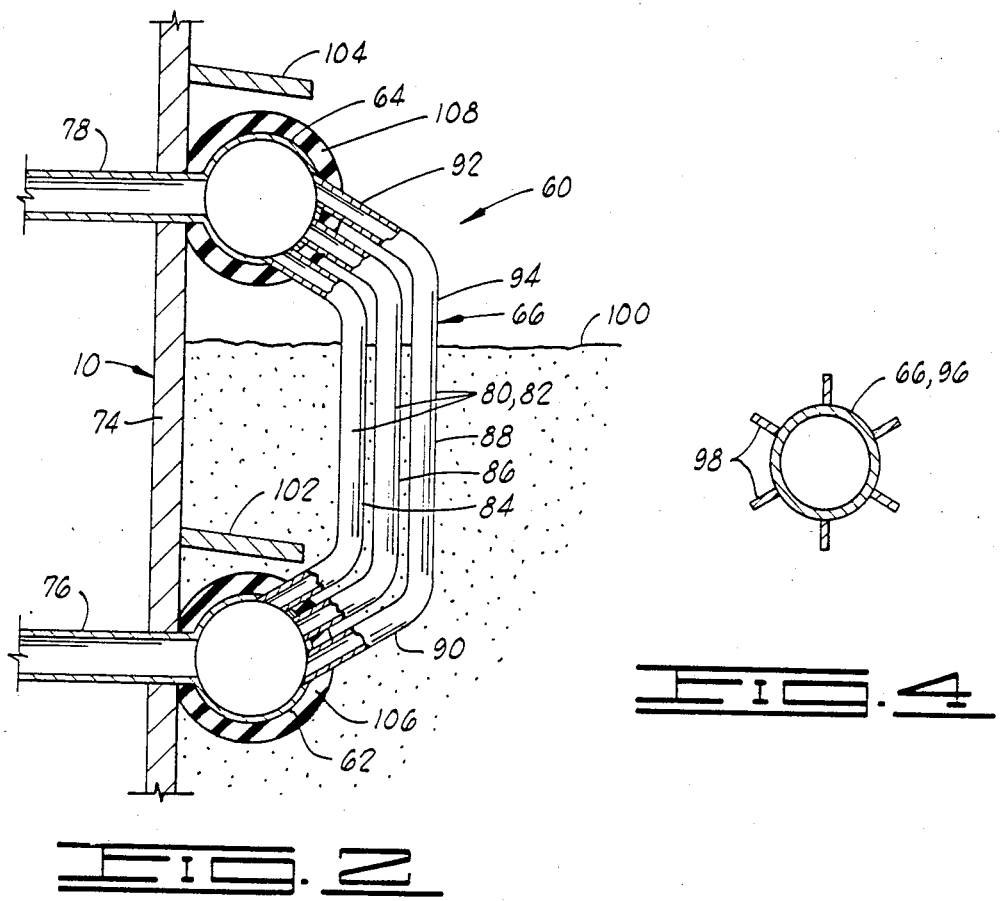
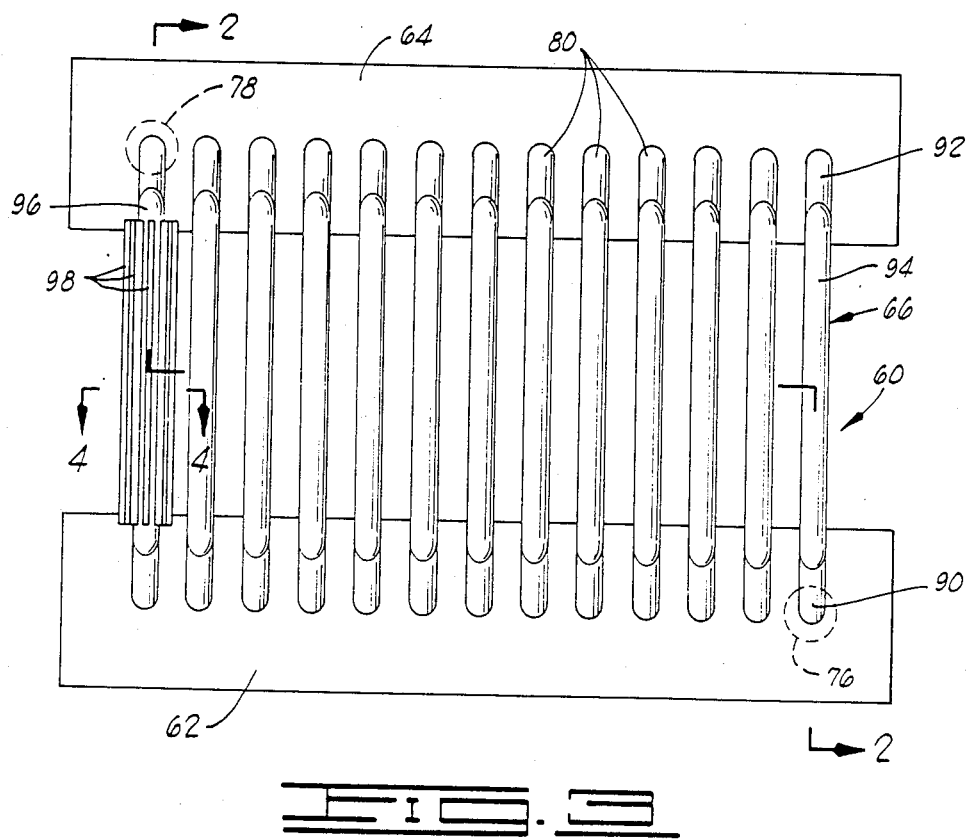

BENT TUBE WASTE HEAT STEAM GENERATOR AND METHOD

BACKGROUND OF THE INVENTION

1. Field Of The Invention

This invention relates to waste heat steam generators in petroleum refinery catalytic cracker regenerators, and more particularly, to a steam generator having bent, vertically oriented heat exchange tubes therein.

2. Description Of The Prior Art

Existing catalytic cracker waste heat boilers use horizontal "bed coils" to gather heat from the regenerator. Corrosion in and cracking of such horizontal tubes is a problem. These adverse conditions are frequently caused by segregation of the steam-water mix in the tubes and/or the alternate wetting and drying of the top interior surfaces of the tubes, causing abnormal thermal stresses. The present invention which utilizes a bent tube waste heat steam generator with a plurality of substantially vertically oriented tubes eliminates such problems because vertically oriented tubes generally have a longer tube life than horizontal tubes, because of being less subject to the undesirable segregation of the steam and water.

U.S. Pat. No. 1,684,083 to Bloom discloses a refrigerating coil having tubes shaped somewhat similarly to tubes in the heat exchanger in the present invention. The coil is constructed so that practically only dry gas is withdrawn therefrom by the pump in the refrigerating system. In the Bloom device, the refrigerant, as opposed to water in the present invention, passes through an expansion valve as it enters the tubes. Thus, the refrigerant is substantially a vapor when it absorbs heat. This is unlike the present invention in which water is generated into steam by the heat transfer. Further, in the present invention, fluid exiting the heat exchange tubes is normally over 80% liquid by weight. As already indicated, in the refrigeration system of Bloom, practically only dry vapor exits the tubes.

U.S. Pat. No. 3,230,158 to Molique discloses a fired heater with heating tubes shaped somewhat similarly to that of the present invention. The tubes interconnect bottom and top headers. In the present invention, of course, a fired heater is not utilized. Rather, the secondary heat exchange medium is catalyst in a regenerator.

U.S. Pat. No. 4,154,197 to Costello et al. discloses a tube generator with tubes somewhat shaped like the present invention. As with Molique, combustion of fuel is used for heat. The Costello et al. apparatus does not have upper and lower manifolds, but instead, the tubes connect directly to upper and lower water drums. Adjacent tubes in Costello et al. may be joined together by fins to provide vertically and horizontally divided areas in the enclosure. Tubes used in the present invention may be either finned or bare depending on heat exchange requirements and/or fabrication costs. When used, the fins in the present invention extend longitudinally and are spaced radially around the tubes.

SUMMARY OF THE INVENTION

The regenerator using the waste heat steam generator of the present invention comprises a shell portion containing a heat exchange medium and a heat exchanger means for containing another heat exchange medium. The heat exchanger means comprises upper manifold means for connecting to a steam riser, lower manifold means for connecting to a water downcomer, and a plurality of substantially C-shaped tubes interconnecting the upper and lower manifold means.

Preferably, each of the tubes comprises a lower portion connected to the lower manifold means and extending angularly upwardly therefrom, an upper portion connected to the upper manifold means and extending angularly downwardly therefrom in substantially the same plane as the lower portion, and an intermediate portion interconnecting the upper and lower portions. Preferably, the intermediate portion is vertically oriented. The plurality of tubes comprises a bank of substantially coplanar, nested tubes in the preferred embodiment. Further, in the heat exchanger means, there are preferably a plurality of rows of such banks of tubes spaced longitudinally with respect to the upper and lower manifold means.

The riser is connected to the upper manifold means and disposed externally of the shell, and the downcomer is connected to the lower manifold means and also disposed externally to the shell. The riser and downcomer connect to a steam drum.

In one embodiment, a vertically oriented fin extends outwardly from an outer surface of at least one of the tubes, and preferably, a plurality of such fins are positioned thereon. Normally, the fins extend only on the intermediate portion of the tube.

A shield may be disposed above at least one of the upper and lower manifold means.

Insulating material may be disposed on the external surfaces of at least one of the upper and lower manifold means.

The apparatus may be used in a method of generating steam in a regenerator, wherein the method comprises the steps of flowing water from a downcomer into a first manifold, discharging water from the first manifold into the lower ends of a plurality of vertically oriented C-shaped tubes in communication with the first manifold, applying heat to the tubes, preferably from catalysts in the regenerator, sufficient to boil the water such that steam is produced in the tubes, discharging the homogeneous steam-water mix from the upper ends of the tubes into a second manifold in communication with the upper ends of the tubes and spaced above the first manifold, and discharging the steam from the second manifold into a riser. Preferably, the first and second manifolds are substantially horizontal, although the invention is not intended to be limited to this configuration. The method may further comprise, prior to the step of flowing the water, positioning the tubes in a pattern having a plurality of substantially vertical rows of coplanar nested tubes. The method may also comprise the steps of insulating at least one of the upper and lower manifolds and shielding the upper surface of at least one of the upper and lower manifolds. The method may also further comprise the step of positioning vertical fins on at least a portion of the tubes.

It is an important object of the invention to provide a regenerator having a bent tube waste heat steam generator in operative association therewith.

It is another object of the invention to provide a heat steam generator with relatively longer tube life than previously known types having horizontal "bed coils".

A further object of the invention is to provide a heat exchanger for a steam generator having upper and lower manifold means with a plurality of substantially C-shaped tubes interconnecting the upper and lower manifolds.

Still another object of the invention is to provide a method of generating steam in a catalyst regenerator by flowing water through a plurality of vertically oriented C-shaped tubes wherein the catalyst supplies sufficient heat to boil the water such that steam is generated in the tubes Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 2 is a vertical cross section of the bent tube heat exchanger taken along lines 2—2 in FIG. 3.

FIG. 3 is an elevational view of the bent tube heat exchanger.

FIG. 4 is a detailed cross section of a tube taken along lines 4—4 in FIG. 3.

DETAILED DESCRIPTION OF THE PREFERRED EMBODIMENT

Figure 1:
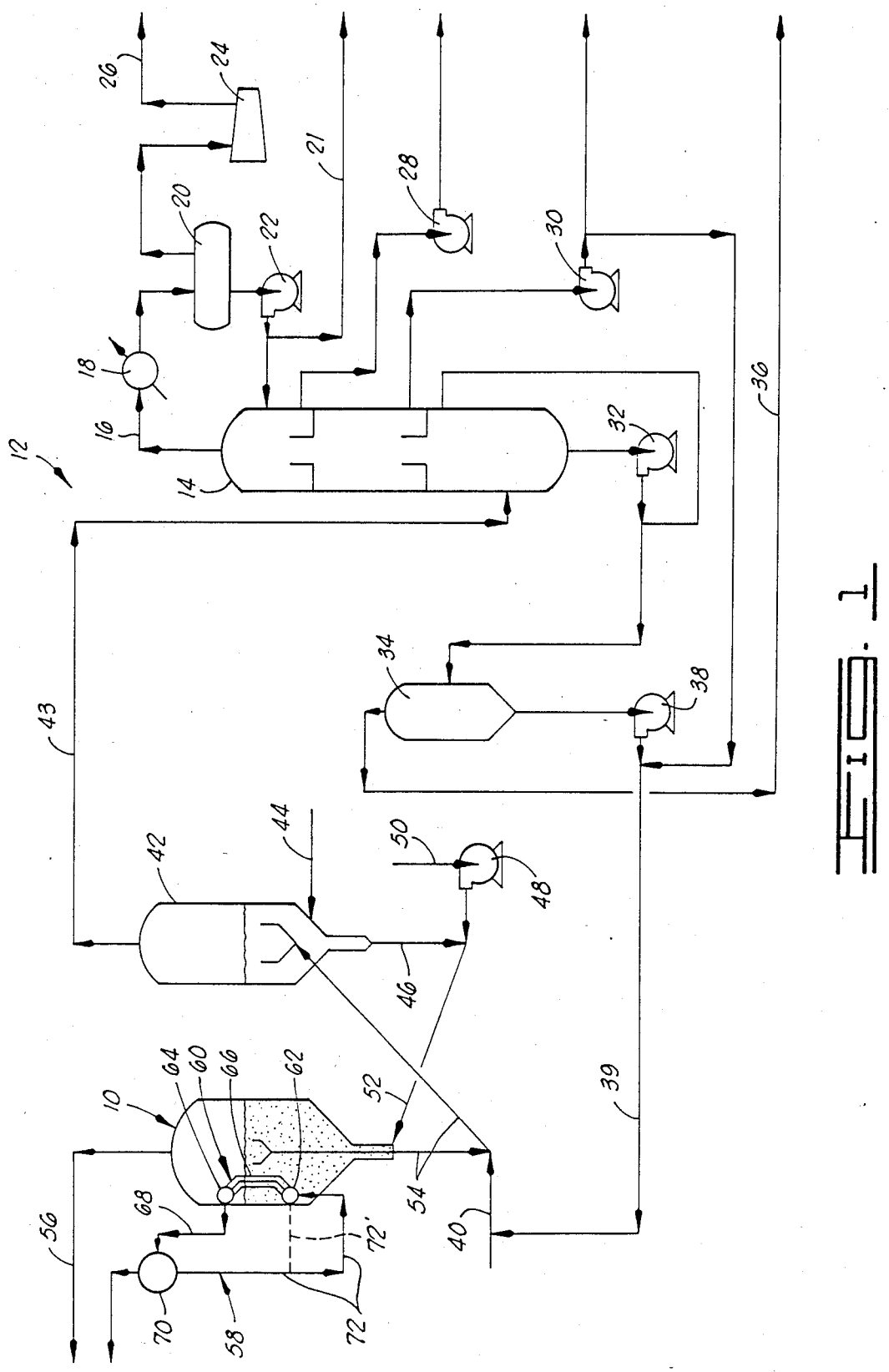
FIG. 1 is a schematic of a catalytic cracking unit using the bent tube waste heat steam generator of the present invention.

Referring now to the drawings, and more particularly to FIG. 1, regenerator with the waste heat steam generator of the present invention is shown and generally designated by the numeral 10 as forming a portion of a catalytic cracking unit 12. Catalytic cracking unit 12 is of a kind well known in the art and will be described herein only in general terms.

Typically, catalytic cracking unit 12 will include a fractionator 14 having a gas outlet line 16 connected thereto. The gas is cooled in a water cooled heat exchanger 18 before it enters a settling tank 20. Any liquids that settle out in settling tank 20 are drawn off as overhead product through line 21 or pumped back to fractionator 14 by pump 22. Gas exits settling tank 20 and enters wet gas compressor 24 which discharges the gas to an absorber (not shown) through discharge line 26.

Fluids are pumped from fractionator 14 at various levels such as by light gas oil pump 28 and heavy gas oil pump 30. A slurry pump 32 pumps slurry from the bottom of fractionator 14 into a slurry settler 34. A slurry decant oil line 36 discharges from the top of slurry settler 34. Another slurry pump 38 pumps recycle slurry from slurry settler 34 through recycle line 39 into fresh feed line 40 which delivers feed to catalytic reactor 42. Catalytic reactor 42 is connected to fractionator 14 by line 43.

Steam enters catalytic reactor 42 through steam line 44. Spent catalyst is discharged from catalytic reactor 42 through line 46. An air blower 48, pulling air in through an inlet line 50, blows the spent catalyst into regenerator 10 through line 52.

Regenerated catalyst exits regenerator 10 through line 54 and is transferred back to catalytic reactor 42. Flue gas is discharged from regenerator 10 through line 56 to power recovery or a boiler (not shown).

A great deal of waste heat is created in regenerator 10, and one way of utilizing this heat is to incorporate a steam generator 58 into regenerator 10. Steam generator 58 includes a heat exchanger means 60 disposed inside regenerator 10. Heat exchanger means 60 includes a lower manifold means 62 and an upper manifold means 64 interconnected by a plurality of heat exchanger tubes 66, as will be discussed in more detail hereinafter. In the embodiment shown in the drawings, heat exchanger means 60 is characterized as a heat exchanger 60 having a first or lower manifold 62 and a second or upper manifold 64, interconnected by tubes 66. Although lower manifold 62 and upper manifold 64 are illustrated in the drawings as being straight, the manifolds could be curved to match the curvilinear contour of the shell of generator 10. Several heat exchangers 60 may be used in regenerator 10 as needed and individually controlled. That is, in case of tube failure in one of the heat exchangers, that heat exchanger may be shut off, and one or more of the others used.

A steam riser 68 discharges from upper manifold 64 into a steam drum 70 of a kind known in the art. A downcomer 72 interconnects steam drum 70 with lower manifold 62 of heat exchanger 60. An alternate embodiment downcomer 72' is shown in phantom lines.

Referring now to FIGS. 2 and 3, details of heat exchanger 60 are shown. Lower manifold 62 is positioned adjacent a shell wall 74 of regenerator 10. An inlet line 76 into lower manifold 62 passes through wall 74 and is connected to, or forms a portion of, downcomer 72 or 72'. Similarly, an outlet line 78 from upper manifold 64 passes through wall 74 and is connected to, or forms a portion of, riser 68. As best seen in FIG. 3, inlet line 76 and outlet line 78 are disposed on opposite sides of heat exchanger 60. This insures a more complete flow through heat exchanger 60, and thus more efficient heat exchanging thereby. However, alternate inlet and outlet locations may be used if proper consideration is given to equalizing the water-steam flow in the tubes.

In the preferred embodiment, lower manifold 62 and upper manifold 64 are substantially horizontal, although it is not intended that the invention be limited to this configuration. For example, upper manifold 64 could be sloped upwardly toward outlet line 78 to help the reduce the possibility of an area in the manifold where steam is predominant and thus less capable of protecting the metal of the manifold than an area where water is present.

As also shown in FIG. 3, tube 66 comprises a plurality of parallel rows, such as indicated by the numeral 80, which are transversely spaced along the longitudinal length of lower manifold 62 and upper manifold 64. Preferably, rows 80 are evenly spaced. Although twelve rows 80 of tubes 66 are illustrated in FIG. 3, the invention is not intended to be limited to this number, and the number of rows 80 may vary as desired.

Referring again to FIG. 2, each row 80 comprises a bank of tubes 82 such as tubes 84, 86 and 88. While three tubes 84, 86 and 88 have been illustrated for the purposes of this disclosure, the invention is not intended to be limited to such a number. That is, the number of tubes in each bank 82 may be varied as desired.

Each of tubes 66 is of substantially C-shaped configuration, and each tube interconnects lower manifold 62 and upper manifold 64. More specifically, each tube 66 preferably comprises a lower portion 90 extending angularly upwardly from lower manifold 62, an upper portion 92 extending angularly downwardly from upper manifold 64 and an intermediate portion 94 interconnecting the upper and lower portions. Preferably, intermediate portion 94 is substantially vertically disposed, and intermediate portion 94, lower portion 90 and upper portion 92 are substantially coplanar vertically. Also, all banks 82 are substantially coplanar in each row 80 of tubes 66.

As shown in FIG. 3, tube 96 on the left of heat exchanger 60 illustrates an alternate embodiment of tubes 66. Referring also to FIG. 4, tube 96 comprises a plurality of radially outwardly extending fins 98 projecting therefrom. Such fins may be used as desired to improve the heat exchange characteristics of any of all of tubes 66. Preferably, fins 98 extend vertically along intermediate portion 94 of the tubes. While six such fins 98 are illustrated, it is to be understood that the invention is not intended to be limited to this particular number or spacing of fins.

Referring again to FIG. 2, it will be seen that lower manifold 62 is disposed below catalyst level 100. This insures that maximum heat exchange takes place through tubes 66. Water entering lower manifold 62 through inlet line 76 is boiled and turned at least partially to steam in tubes 66 such that steam and water is discharged from heat exchanger 66 through upper manifold 64 and outlet line 78. The vertical orientation of tubes 66, and fins 98 if used, insures that catalyst cannot collect on the fins in an undesirable way to disrupt an even heat exchange through heat exchanger 60. A lower shield 102 and an upper shield 104 may be attached to shell wall 74, as desired, to reduce flowing a hot catalyst across the upper surfaces of lower manifold 62 and upper manifold 64, respectively. Shields 102 and 104 preferably extend the entire longitudinal length of manifolds 62 and 64, respectively.

To insure that heat exchange only takes place in tubes 66, an insulation layer 106 may be applied to lower manifold 62 and a similar insulation layer 108 may be positioned around upper manifold 64.

In a method of use of the apparatus for generating steam in regenerator 10, water is flowed from downcomer 72 into first manifold 62. Water is discharged from lower manifold 62 into the lower ends of tubes 60, and heat is applied from the catalyst in regenerator 10 sufficient to boil the water in the tubes such that some steam is produced therein. Water and steam are then discharged from the upper ends of tube 60 into second manifold 64 and discharged therefrom into riser 68 by which it is carried back to steam drum 70.

It can be seen, therefore, that the regenerator and bent tube waste heat steam generator of the present invention are well adapted to carry out the ends and advantages mentioned, as well as those inherent therein. While a presently preferred embodiment of the apparatus has been described for the purposes of this disclosure, numerous changes in the arrangement and construction of parts may be made by those skilled in the art. All such changes are encompassed within the scope and spirit of the appended claims.

What is claimed is:

1. A regenerator apparatus comprising:
a shell portion containing spent catalyst from a catalytic reactor as a heat exchange medium; and
heat exchanger means containing another heat exchange medium and comprising:
   upper manifold means;
   lower manifold means; and
   a plurality of substantially C-shaped tubes interconnecting said upper and lower manifold means.

2. The apparatus of claim 1 wherein each of said tubes comprises:
a lower portion connected to said lower manifold and extending angularly upwardly therefrom;
an upper portion connected to said upper manifold and extending angularly downwardly therefrom in substantially the same plane as said lower portion; and
an intermediate portion interconnecting said upper and lower portions.

3. The apparatus of claim 1 wherein said plurality of tubes comprises a bank of substantially coplanar tubes.

4. The apparatus of claim 3 wherein there are a plurality of said banks of tubes spaced longitudinally with respect to said upper and lower manifold means.

5. The apparatus of claim 1 wherein at least one of said tubes comprises a vertically oriented fin extending outwardly from an outer surface of said one tube.

6. The apparatus of claim 1 further comprising:
a riser connected to said upper manifold means and disposed externally of said shell; and
a downcomer connected to said lower manifold means and disposed externally of said shell.

7. A heat exchanger for use in a catalytic regenerator heat recovery system using spent catalyst from a catalytic reactor as a heat exchange medium, said heat exchanger comprising:
a lower manifold defining an inlet thereinto;
an upper manifold spaced from said lower manifold and defining an outlet therein; and
a plurality of substantially C-shaped tubes, each of said tubes having a lower end connected to said first manifold and an upper end connected to said upper manifold, said tubes being adapted for contact by said spent catalyst along at least a portion of an outer surface of said tubes for heating a fluid discharged from said lower manifold to said tubes and for discharge of heated fluid from said tubes into said upper manifold.

8. The apparatus of claim 1 wherein said plurality of tubes comprises a nested bank of tubes, said tubes in said bank being substantially coplanar.

9. The apparatus of claim 8 comprising a plurality of rows of said banks of tubes, said rows being substantially parallel to one another.

10. The apparatus of claim 7 wherein at least one of said tubes comprises a plurality of vertically oriented fins extending outwardly therefrom.

11. The apparatus of claim 7 further comprising insulating material disposed on external surfaces of at least one of said upper and lower manifolds.

12. The apparatus of claim 7 wherein:
said lower ends of said tubes are sloped upwardly from said first manifold;
said upper ends of said tubes are sloped downwardly from said second manifold; and
each of said tubes further comprises a substantially vertical central portion interconnecting said upper and lower ends.

13. A method of generating steam in a catalytic regenerator comprising the steps of:
flowing water from a downcomer into as substantially horizontal first manifold;
discharging water from said first manifold into lower ends of a plurality of vertically oriented C-shaped tubes in communication with said first manifold;
applying heat from hot catalyst particles disposed around at least a portion of the outside of said tubes, said heat being sufficient to boil said water such that steam is produced in said tubes;
discharging said steam from upper ends of said tubes into a substantially horizontal second manifold in communication with said upper ends and spaced above said first manifold; and discharging said steam from said second manifold into a riser.

14. The method of claim 13 further comprising, prior to said step of flowing said water, positioning said tubes in a pattern having a plurality of substantially vertical rows of coplanar nested banks of tubes.

15. The method of claim 13 further comprising the step of insulating at least one of said upper and lower manipulating folds.

16. The method of claim 13 comprising the step of positioning vertical fins on at least a portion of said tubes.

17. A regenerator apparatus comprising:
a shell portion containing a heat exchange medium;
heat exchanger means containing another heat exchange medium and comprising:
upper manifold means;
lower manifold means; and
a plurality of substantially C-shaped tubes interconnecting said upper and lower manifold means; and
a shield disposed in said shell portion above at least one of said upper and lower manifold means.

18. The apparatus of claim 17 wherein said shield is attached to as wall of said shell portion.

19. The apparatus of claim 17 wherein said shield extends substantially along a longitudinal length of said one of said upper and lower manifold means.

20. A method of generating steam in a regenerator comprising the steps of:
flowing water from a downcomer into a substantially horizontal first manifold;
discharging water from said first manifold into lower ends of as plurality of vertically oriented C-shaped tubes in communication with said first manifold;
applying heat to said tubes sufficient to boil said water such that steam is produced in said tubes;
discharging said steam from upper ends of said tubes into a substantially horizontal second manifold in communication with said upper ends and spaced above said first manifold;
shielding within the regenerator the upper surface of at least one of said upper and lower manifolds; and
discharging said steam from said second manifold into a riser.

21. The apparatus of claim 1 wherein said shell portion is substantially cylindrical.

22. The apparatus of claim 1 wherein said C-shaped tubes extend away from an adjacent wall of said shell portion.

23. The apparatus of claim 1 wherein said tubes extend toward a central axis of said shell portion.

24. The apparatus of claim 1 wherein said C-shaped tubes are spaced longitudinally along said upper and lower manifold means.

25. The apparatus of claim 1 wherein said upper and lower manifold means are substantially parallel to one another.

26. The apparatus of claim wherein said upper and lower manifold means are substantially perpendicular to an axis of said shell portion.

27. The apparatus of claim 2 wherein said intermediate portion of said tubes is substantially parallel to an axis of said shell portion.

28. The apparatus of claim 2 wherein said intermediate portion is a major portion of said tubes.

29. The apparatus of claim 7 wherein said C-shaped tubes are spaced longitudinally along said upper and lower manifolds.

30. The apparatus of claim 7 wherein said upper and lower manifolds are substantially parallel to one another.

31. The apparatus of claim 12 wherein said vertical central portion forms a major portion of the corresponding tube.

32. The method of claim 13 further comprising the step of supplying said hot catalyst as spent catalyst from a catalytic reactor.

* * * * *

UNITED STATES PATENT AND TRADEMARK OFFICE
CERTIFICATE OF CORRECTION

PATENT NO. : 4,811,696

DATED : March 14, 1989

INVENTOR(S) : Ralph G. Lacquement and William L. Ruggles

It is certified that error appears in the above-identified patent and that said Letters Patent is hereby corrected as shown below:

Column 6, Claim 7, line 33, delete "to" and insert --into-- therefor.

Column 6, Claim 8, line 36, delete "1" and insert --7-- therefor.

Column 7, Claim 15, line 11, delete "manipulating folds" and insert --manifolds-- therefor.

Column 7, Claim 18, line 27, delete "as" and insert --a-- therefor.

Column 7, Claim 20, line 36, delete "as" and insert --a-- therefor.

Column 8, Claim 26, line 21, after "claim" and before "wherein", insert --1--.

Signed and Sealed this

Twenty-second Day of August, 1989

Attest:

DONALD J. QUIGG

Attesting Officer

Commissioner of Patents and Trademarks